United States Patent [19]

McMurtry

[11] Patent Number: 5,755,038
[45] Date of Patent: May 26, 1998

[54] TOUCH PROBE

[75] Inventor: David R. McMurtry, Wotton-Under-Edge, United Kingdom

[73] Assignee: Renishaw PLC, Wotton-Under-Edge, England

[21] Appl. No.: 669,489
[22] PCT Filed: Nov. 15, 1995
[86] PCT No.: PCT/GB95/02669
  § 371 Date: Jul. 11, 1996
  § 102(e) Date: Jul. 11, 1996
[87] PCT Pub. No.: WO96/16312
  PCT Pub. Date: May 30, 1996

[30] Foreign Application Priority Data

Nov. 17, 1994 [GB] United Kingdom ............ 9423176

[51] Int. Cl.$^6$ .................................................. G01B 5/20
[52] U.S. Cl. ....................................... 33/559; 33/556
[58] Field of Search ......................... 33/559, 556, 558, 33/561

[56] References Cited

U.S. PATENT DOCUMENTS

| | | | |
|---|---|---|---|
| 5,083,379 | 1/1992 | Enderle et al. | 33/559 |
| 5,339,535 | 8/1994 | McMurtry et al. | 33/561 |
| 5,345,689 | 9/1994 | McMurtry et al. | 33/559 |
| 5,435,072 | 7/1995 | Lloyd et al. | 33/559 |

FOREIGN PATENT DOCUMENTS

| | | |
|---|---|---|
| A-0 501 710 | 9/1992 | European Pat. Off. |
| C-34 27 413 | 1/1986 | Germany . |
| WO 92/21932 | 12/1992 | WIPO . |

*Primary Examiner*—Christopher W. Fulton
*Attorney, Agent, or Firm*—Oliff & Berridge

[57] ABSTRACT

A touch probe has a sensing module 10 and a stylus module 12 magnetically retained and kinematically located thereon. A stylus holder 102 is biased into a kinematic rest location within the stylus module 12. The sensing module 12 has a fixed structure provided by connector 14, cylindrical housing 16, and circuit supporting structure 18. An intermediate load member 30 is connected to structure 18 at one end by means of a relatively resilient diaphragm 40 and at the other by three supporting struts 50, extending at an angle of 45° to the axis A. The load member 30 carries a circular retaining plate 22 upon which the stylus module 12 is located. During a measurement operation, a force applied to stylus tip 112 will cause bending of struts 50, and deformation of diaphragm 40 prior to movement of the stylus holder 102 out of its kinematic rest position. Strain gauges provided on the struts 50 detect this bending and generate an output signal accordingly.

11 Claims, 2 Drawing Sheets

TOUCH PROBE

BACKGROUND OF THE INVENTION

1. Field of the Invention

The invention relates to a touch probe which, for example, may be mounted on the movable arm of a coordinate positioning machine such as a machine tool or coordinate measuring machine for the purpose of enabling the machine to determine the position of a surface. One known form of touch probe is a "touch trigger probe", which includes a fixed structure, such as a housing, by which the probe is supported on the movable arm, and a stylus holder carrying an elongate stylus having a sensing tip at its free end. The stylus holder is located in a rest position relative to the fixed structure, from which it may be displaced when a force is applied to the stylus; the stylus holder returns to a rest position after the force has been removed. In use, the movable arm of the machine is driven until the sensing tip of the stylus is brought into contact with an object whose position is to be measured. Contact between the sensing tip and the object causes the emission of a trigger signal from an interface processing circuit connecting the probe to the machine control. The trigger signal is used to instruct the machine control to record the position of the movable arm, and to arrest movement of the movable arm.

2. Description of the Related Art

It is known to sense contact between the sensing tip of the stylus and the surface under inspection by employing one or more sensors in the probe which generate an output signal when subject to tension or compression. These sensors may for example be piezoelectric, as shown for example in U.S. Pat. Nos. 4,177,568, 4,364,180, 4,455,755, 5,435,072, WO86/03829, or may be strain gauges as shown in U.S. Pat. Nos. 4,462,162, 4,813,151 or 5,339,535.

SUMMARY OF THE INVENTION

The present invention provides an alternative touch probe. According to the present invention a touch probe for use on a coordinate positioning machine having an arm and a base movable relative to each other comprises:

a fixed structure having an axis;

a load member, said load member being connected to said fixed structure at a first location by at least one first connecting element, and at a second location, axially spaced from the first location, by at least one second connecting element;

at least one first engagement element connected to said load member;

a stylus holder carrying an elongate stylus having a sensing tip at a free end thereof, the stylus holder having at least one second engagement element, said first and second engagement elements being mutually engageable to provide a rest location for said stylus holder;

biasing means for applying an axial biasing force to said stylus holder, thereby to urge said first and second engagement elements into said mutual engagement, the stylus holder being deflectable against the action of the biasing means, thereby to cause disengagement of said first and second engagement elements, when a force is applied to the sensing tip, and said first and second engagement elements being re-engageable under the action of the biasing means when said applied force is removed, thereby to return said stylus to a rest location;

a plurality of sensors sensitive to tension and compression for generating signals responsive to changes in relative displacement of said fixed structure and said load member due to deformation of one or more of said connecting elements; wherein the stiffness of said connecting elements and the sensitivity of said sensors is such that when a force is applied to said sensing tip at least one of said sensors generates a signal indicative of strain in at least one of said connecting elements prior to disengagement of said first and second engagements elements.

Such a probe may be adopted to function either as a two or three dimensional probe.

BRIEF DESCRIPTION OF DRAWINGS

Embodiments of the present invention will now be described, by way of example, and with reference to the accompanying drawings in which.

DESCRIPTION OF PREFERRED EMBODIMENTS

Figure 1:
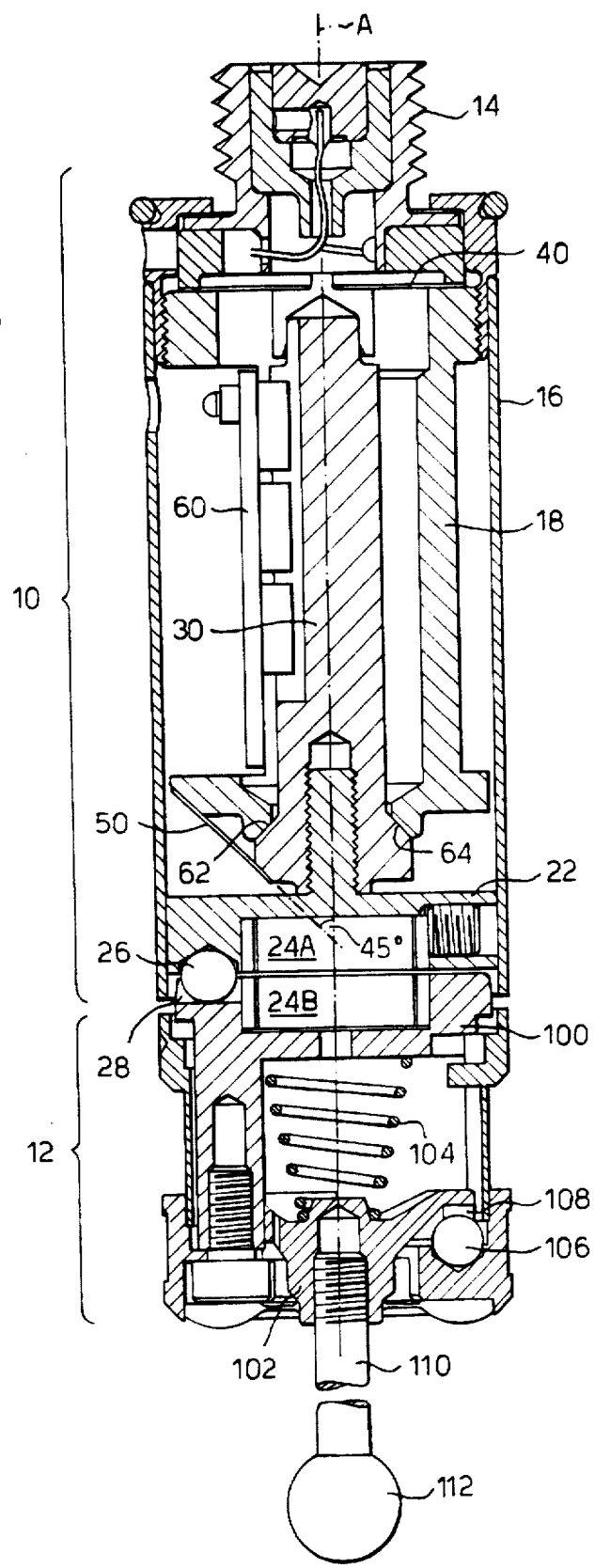
FIG. 1 is a section through an embodiment of probe according to the present invention.
Figure 2:
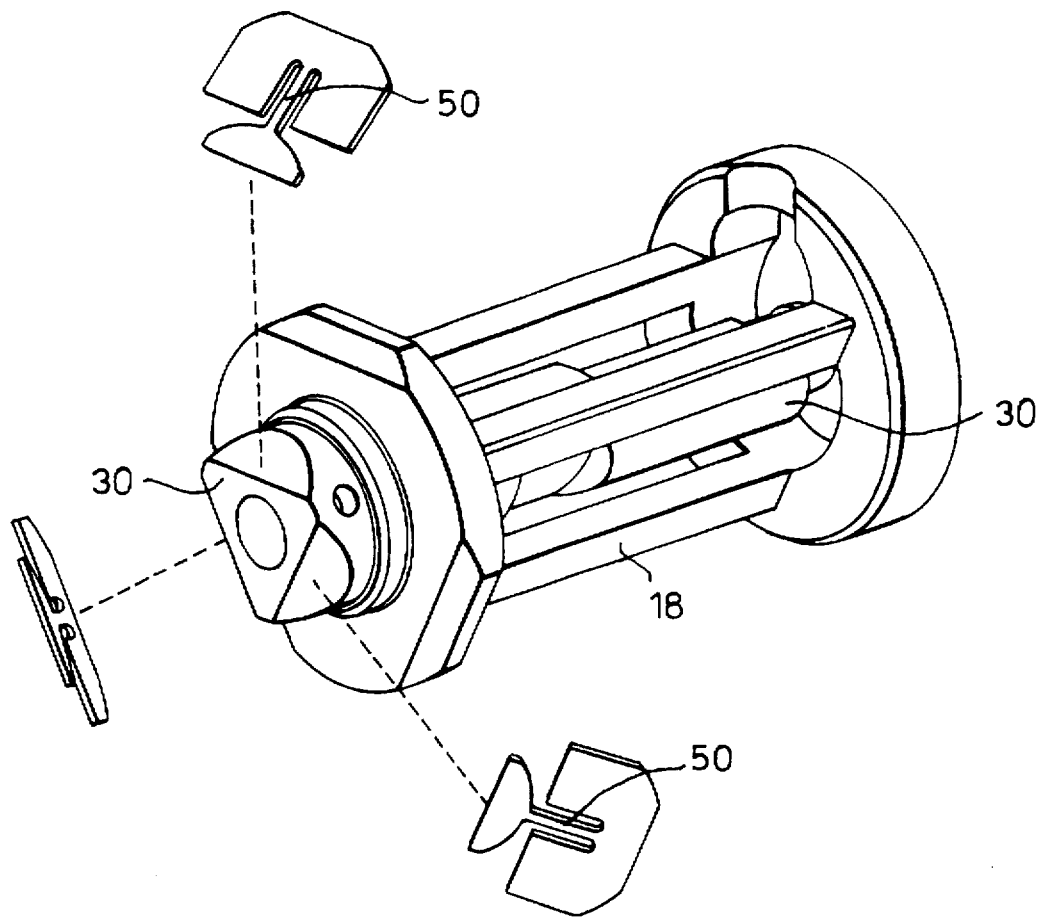
FIG. 2 is a perspective view of a part of the probe illustrated in FIG. 1.

Referring now to FIG. 1, a touch probe includes a strain-sensitive sensing module 10, and a stylus module 12 releasably connectable to the sensing module 10. The stylus module 12 is magnetically retained on the sensing module 10 (to enable exchange of one stylus module 12 for another) by means of permanent magnets 24A, 24B, provided on the sensing module 10 and stylus module 12 respectively, and repeatably located thereon by a kinematic support in the form of three balls 26 on the sensing module 10 and three v-grooves 28 on the stylus module 12. The stylus module 12 includes a casing 100 and a stylus holder 102 biased into a rest location with respect to casing 100 by means of spring 104. Cooperating engagement elements in the form of three balls 106 on the casing 100 and three v-grooves 108 on the stylus holder 102 locate the stylus holder 102 in a said rest position. Any suitable number and configuration of engagement elements may be employed.

The sensing module 10 has a fixed structure provided by a screw-threaded coaxial electrical connector 14, a cylindrical housing 16, and an elongate substantially triangular circuit supporting structure 18, all of which are rigidly connected with each other. A load member 30 extends through the centre of the circuit supporting structure 18, is connected to the end of the circuit supporting structure 18 adjacent the terminal 14 by means of a relatively resilient diaphragm 40, and to the distal axially spaced end of the supporting structure 18 by means of three equispaced relatively resilient interconnecting struts 50. In the illustrated embodiment the diaphragm 40 has an "Isle of Man" configuration, but other diaphragms may be used. The struts 50 subtend an angle of approximately 450° relative to the axis A, and the axis of each of the struts 50 intersect at a substantially common point substantially upon the axis. Each of the struts 50 carries a strain gauge (not shown); the strain gauges are each connected to an ASIC signal processor 60, which is wrapped around the supporting structure 18.

The load member 30 rigidly carries a circular retaining plate 22, on which permanent magnet 24A and balls 26 are provided. When the stylus module 12 is connected to the sensing module 10, the casing 100 of stylus module 12 is therefore effectively rigid with the load member 30 to within the limit of the stiffness of the magnetic connection of the sensing module 10 and stylus module 12.

The stylus holder 102 carries an elongate stylus 110 having a spherical sensing tip 112 at its free end. During a measuring operation the arm of the machine on which the probe is mounted will be driven to move the sensing tip 112 into contact with a surface whose position is to be measured. Upon contact of the sensing tip 112, the initial strain generated by the contact is transmitted through the stylus module 12 to the load member 30 due to their relatively rigid interconnection. The resultant microscopic movement of the load member 30 relative to the fixed structure, and in particular relative to the circuit supporting structure 18 of the sensing module 10 will result in a small flexing of at least the resilient interconnecting struts 50 as well as some deformation of diaphragm 40. The nature of the deformation of diaphragm 40 is dependent upon the direction of the force applied to the sensing tip 112 by virtue of contact with the surface. For example, an applied force in a direction orthogonal to the axis A will result in pivoting of load member 30 about a point in the region of the diaphragm 40 and therefore a small buckling of the diaphragm 40. An axial force will cause the load member 30 to displaced linearly.

Flexing or other deformation of struts 50 will cause a corresponding change in resistance across the strain gauges supported on the struts 50, and this resistance change is detected by the ASIC processor 60 which generates a trigger output as a result. The stiffness of the struts 50 and sensitivity of the gauges is such that the trigger signal will be generated a relatively short time after contact of the sensing tip 112 with the surface and in any event, while the engagement elements 106,108 in the stylus module 12 are still engaged. Further movement of the arm of the machine will occur before receipt of the trigger signal by the machine control arrests its movement, and this further movement ("overtravel") is accommodated by disengagement of the elements 106,108.

When the arm has come to a standstill, it is then reversed away from the surface, whereupon the biasing spring 104 causes re-engagement of elements 106,108 and the strain resulting from the stylus-surface contact is removed. The resultant deformation in the interconnecting struts 50 therefore disappears, and the resistance of the strain gauges returns substantially to its previous value, producing a corresponding change in the output of the ASIC processor 60. Suitably, the ASIC processor 60 will contain auto-zero circuits, as described in U.S. Pat. No. 4,817,362 which take account of long term drift in the resistance of the strain gauges, thereby preventing the generation of false triggers due to such drift.

The sensitivity of the strain gauges, and the corresponding relative fragility of the interconnecting struts 50 mean that the sensing module 10 is exceedingly susceptible to damage caused, for example, by dropping the module. In one embodiment therefore the region of the interconnecting struts 50, the load member 30 and supporting structure 18 have mutually confronting frusto-conical surfaces 62,64 which are separated from each other by a small distance (of the order of 10 microns). A coating of oil is retained within the resultant cavity by means of capillary action. We have found that the "squeeze-film damper" provided by the oil which fills the cavity between the confronting frusto-conical surfaces 62,64 on the plunger 30 and circuit supporting structure 18 acts to attenuate a large proportion of the shock when the sensing module 10 is dropped, and thereby reduces the susceptibility of the probe to damage.

The embodiments described have exemplified the present invention by reference to a probe construction including releasably connectable modules 10,12. In an alternative a conventional construction may be adopted in which a stylus holder is biased directly into engagement with the retaining plate 22 of load member 30.

As an alternative to strain gauges other sensors sensitive to tension and compression may be employed, such as piezoelectric or electrostrictive elements. In every case the sensors need not be provided on the struts 50; they may be located wherever suitable, including on diaphragm 40.

I claim:

1. A touch probe for use on a coordinate positioning machine comprising:

a fixed structure having an axis, and a load member which is connected to the fixed structure at first and second axially spaced locations by at least one first connecting element that is inclined to the axis, and at least one second connecting element respectively;

a stylus holder which carries an elongate stylus having a sensing tip at a free end thereof;

at least one first engagement element connected to the load member and at least one second engagement element on the stylus holder, the first and second engagement elements being biased into mutual engagement by virtue of biasing means which applies an axial biasing force to urge the first and second engagement elements into mutual engagement, the stylus holder being deflectable against the action of the biasing means, thereby to cause disengagement of the first and second engagement elements, when a force is applied to the sensing tip, and the first and second engagement elements being re-engageable under the action of the biasing means when the applied force is removed; and a plurality of sensors which generate signals responsive to changes in relative displacement of the fixed structure and the load member due to deformation of one or more of the connecting elements, the stiffness of the connecting elements and the sensitivity of the sensors being such that, when a force is applied to the sensing tip, at least one of the sensors generates a signal indicative of strain in at least one of the connecting elements prior to disengagement of the first and second engagement elements.

2. A touch probe according to claim 1 wherein the first location is situated closer to the sensing tip of the stylus than the second location, and wherein, upon the application of a force to the sensing tip acting in a direction transverse to the axis, the at least one second connecting element permits tilting displacement of the stylus holder and load member relative to the fixed structure prior to disengagement of the first and second mutually engageable elements.

3. A touch probe according to claim 2 wherein the at least one second connecting element permits axial displacement of the load member relative to the fixed structure upon the application of an axial force to the sensing tip.

4. A touch probe according to claim 1 comprising three first connecting elements.

5. A touch probe according to claim 1 wherein the at least one second connecting element is a diaphragm.

6. A touch probe according to claim 1 wherein the sensors are located between the fixed structure and load member.

7. A touch probe according to claim 1 wherein the sensors are sensitive to tension and compression.

8. A touch probe according to claim 7 wherein the sensors are provided on the first connecting elements.

9. A touch probe according to claim 1, wherein the probe is a trigger probe.

10. A touch probe for use on a coordinate positioning machine comprising:

a fixed structure having an axis, and a load member which is connected to the fixed structure at first and second axially spaced locations by at least one first connecting element and at least one second connecting element respectively;

a stylus holder which carries an elongate stylus having a sensing tip at a free end thereof;

at least one first engagement element connected to the load member and at least one second engagement element on the stylus holder, the first and second engagement elements being biased into mutual engagement by virtue of biasing means which applies an axial biasing force to urge the first and second engagement elements into mutual engagement, the stylus holder being deflectable against the action of the biasing means, thereby to cause disengagement of the first and second engagement elements, when a force is applied to the sensing tip, and the first and second engagement elements being re-engageable under the action of the biasing means when the applied force is removed; and a plurality of sensors located between the fixed structure and the load member, which generate signals responsive to changes in relative displacement of the fixed structure and the load member due to deformation of one or more of the connecting elements, the stiffness of the connecting elements and the sensitivity of the sensors being such that, when a force is applied to the sensing tip, at least one of the sensors generates a signal indicative of strain in at least one of the connecting elements prior to disengagement of the first and second engagement elements.

11. A touch probe for use on a coordinate positioning machine comprising:

a fixed structure having an axis, and a load member which is connected to the fixed structure at first and second axially spaced locations by at least one first connecting element and at least one second connecting element respectively;

a stylus holder which carries an elongate stylus having a sensing tip at a free end thereof;

at least one first engagement element connected to the load member and at least one second engagement element on the stylus holder, the first and second engagement elements being biased into mutual engagement by virtue of biasing means which applies an axial biasing force to urge the first and second engagement elements into mutual engagement, the stylus holder being deflectable against the action of the biasing means, thereby to cause disengagement of the first and second engagement elements, when a force is applied to the sensing tip, and the first and second engagement elements being re-engageable under the action of the biasing means when the applied force is removed; and a plurality of sensors provided on the first connecting elements, which generate signals responsive to changes in relative displacement of the fixed structure and the load member due to deformation of one or more of the connecting elements, the stiffness of the connecting elements and the sensitivity of the sensors being such that, when a force is applied to the sensing tip, at least one of the sensors generates a signal indicative of strain in at least one of the connecting elements prior to disengagement of the first and second engagement elements.

* * * * *